UNITED STATES PATENT OFFICE.

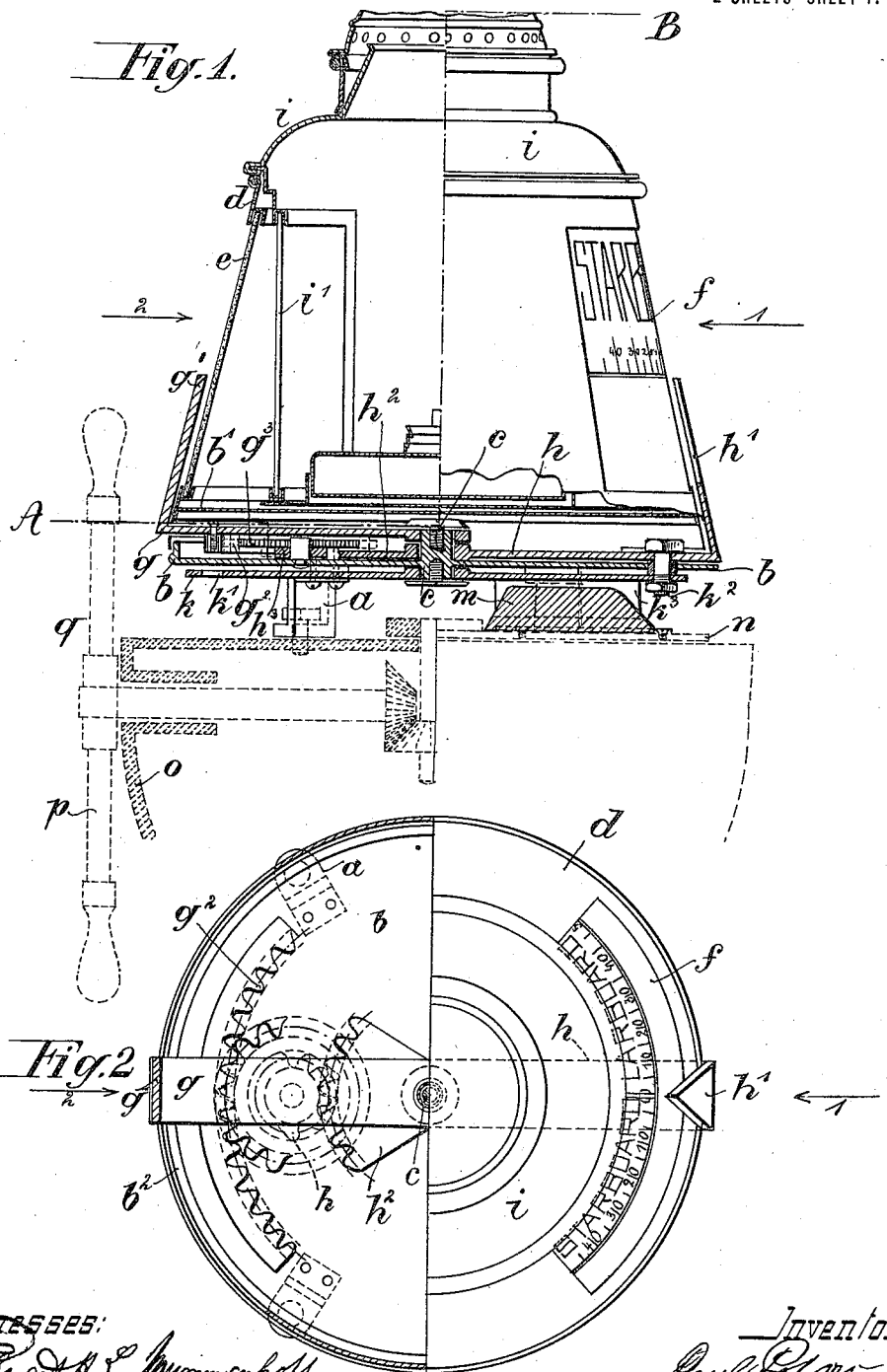

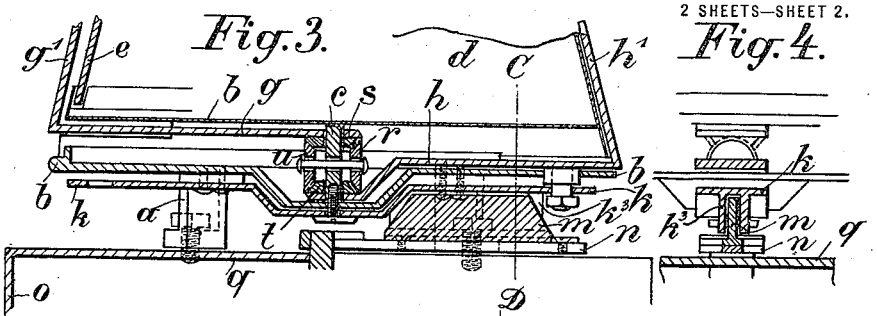
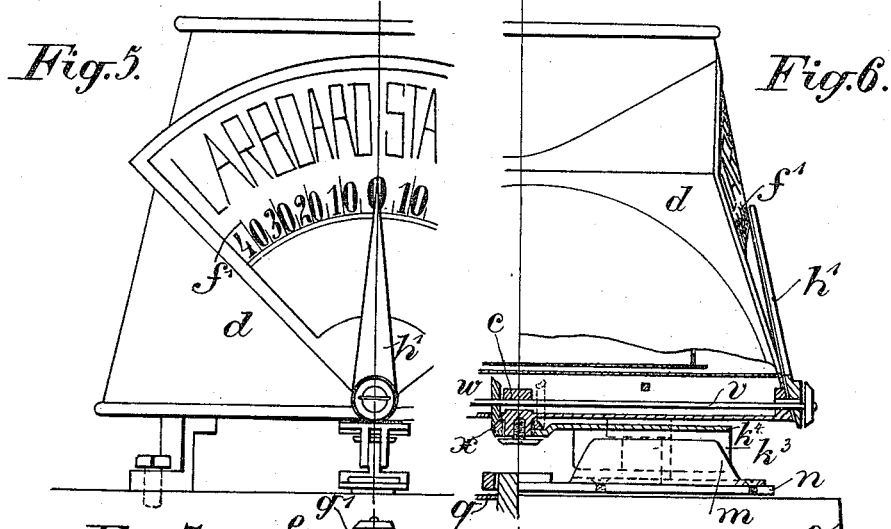
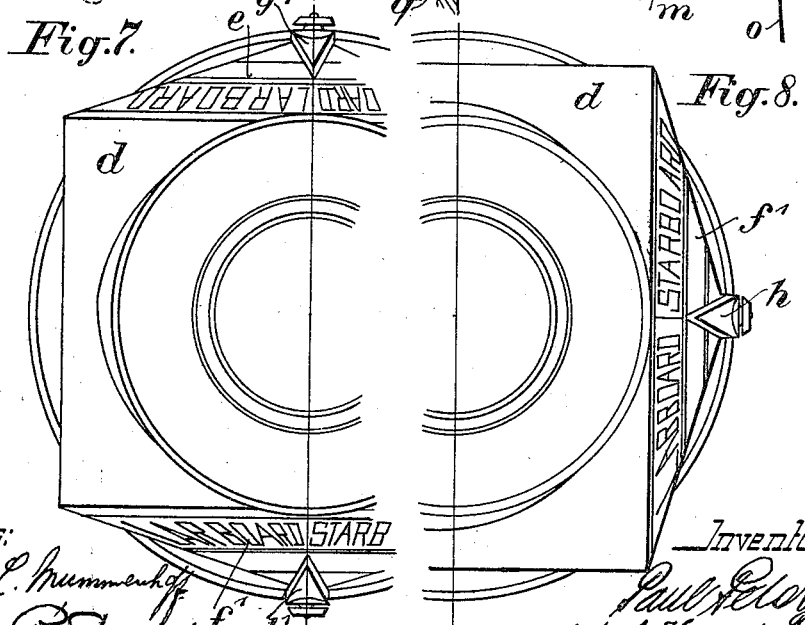

PAUL PETERS, JAKOB HINRICH PETERS, AND PETER ALBERT BEY, OF HAMBURG, GERMANY.

HELM-SIGNAL.

1,173,680.   Specification of Letters Patent.   Patented Feb. 29, 1916.

Application filed June 13, 1912.   Serial No. 703,575.

*To all whom it may concern:*

Be it known that we, PAUL PETERS, technologist, JAKOB HINRICH PETERS, and PETER ALBERT BEY, both manufacturers, subjects of the German Emperor, all residing at Vorsetzen 16, Hamburg, Germany, have invented certain new and useful Improvements in Helm-Signals, of which the following is a specification.

The present invention relates to a device for signaling the position of a ship's rudder and consists in the provision of a conical casing containing a light source and fitted with exchangeable diametrically opposed transparent plates furnished with graduated scales and with the direction inscriptions "Starboard" and "Larboard" or their equivalents. These inscriptions are so arranged that the words "Starboard" occur at the same side of a plane intersecting the center of the casing longitudinally of the ship, the words "Larboard" being disposed at the other side. Upright pointers are provided which move along the scale and which are interconnected so as to move in unison to the same side of the ship. The casing is adapted to be mounted on the helm stanchion and the pointers to be coupled to the existing helm pointer, the arrangement being such that by reversing the position of the casing and by exchanging the transparent plates one for the other, the mode of indication can be adjusted to suit the custom of the particular crew employed, whether said helm pointer is directed forward or aft and whether it turns to the same side as the rudder or not. By this arrangement indications are obtained which can easily be read off night and day, and errors, due to the crew having to be guided by the indications to which they are not accustomed, are obviated.

In the accompanying drawings the invention is illustrated by way of example, Figure 1 representing a side-view of the device partly in central section, Fig. 2 a plan of the same, partly in section on the line A—B of Fig. 1, Fig. 3, a sectional side view showing a modification of the pointer connections, Fig. 4 a section on the line C—D of Fig. 3, Fig. 5 a partial front view of a modified construction, Fig. 6, a sectional side view of the same, Fig. 7, a plan of Fig. 5, and Fig. 8, a plan of Fig. 6.

The upper part of the helm stanchion is designated $o$, and it has a circular platform $q$ which is provided in known manner with a graduated scale and with the directive inscriptions "Larboard" and "Starboard".

$p$ is the steering wheel which is mounted in the stanchion, and $n$ is the pointer which is connected to the steering gear and which indicates the rudder position on the platform $q$.

The device according to the present invention consists of a conical casing $d$ having two diametrically opposed transparent plates $e$ and $f$ and a double bottom $b$ and $b^1$. The plates $e$, $f$ can be substituted one for the other and are provided, at both sides of a vertical center line, with graduations and with the inscriptions "Larboard" and "Starboard". One of these inscriptions is arranged to the right and the other to the left of the central line, the arrangement being such however that the two "Starboard" inscriptions are at one and the "Larboard" inscriptions at the other side of a vertical plane intersecting the center of the casing $d$ longitudinally of the ship. The casing $d$ is firmly connected to the platform $q$ by means of suitable legs $a$, of which two are preferably provided at each side of the central plane, said legs being screwed to the platform. On the outside, in front of the plates $e$ and $f$, two upright pointers $g^1$ and $h^1$ are disposed which are carried by horizontal arms $g$ and $h$ respectively, such arms being projected from between the bottom walls through slots $b^2$ (Fig. 2) and adapted to turn to both sides about a central pivot $c$ connected to the lower bottom wall $b$. The arm $h$ is prolonged beyond the pivot $c$ and formed into a toothed segment $h^2$ which meshes with a pinion $h^3$ mounted on the plate $b$. The pinion $h^3$ is connected to a wheel $g^3$ which in its turn meshes with a curved rack $g^2$ attached to the arm $g$. From this arrangement it follows that when one arm is turned horizontally from the center position in Fig. 2 to either side, the other arm will move synchronously to the same side.

The pivot $c$ is prolonged downward beyond the plate $b$ and holds, underneath said plate, a double-armed lever $k$ having in each arm, equidistant from the fulcrum, an aperture $k^1$ through which a screw-bolt $k^2$ can be passed for fastening either arm to the arm $h$. A curved slot is provided in the plate $b$ to admit said screw-bolt and allow it to move with the arm. The arm $k$ carries a downwardly directed fork formed of two parallel plates $k^3$ between which an upright plate $m$, connected to the pointer $n$ is accommodated, as shown in Fig. 4.

A removable lantern $i$ is supported in the casing $d$ so as to throw its light on the plates $e$ and $f$ through two diametrically opposed glass plates $i^1$.

The *modus operandi* is as follows:—If the helms-man turns the steering wheel to the right, that is to "starboard", the pointer $n$ will also be turned to the right. Since this pointer is coupled by means of the elements $n$, $k^3$, $k$ and $k^2$ to the pointer $h^1$, it is evident that the latter will be deflected so as to indicate to the ship-master, looking in the direction of the arrow 1. the "starboard" position of the rudder. The deflection of the pointer $h^1$ causes the pointer $g^1$, through the medium of the gearing $h^2$, $h^3$, $g^3$ and $g^2$, to be deflected to the same side so as to indicate the same rudder position to the helmsman who looks in the direction of the arrow 2. The opposite occurs if the steering wheel is turned to the left.

In the construction shown in Fig. 1 the pointer $n$ is directed away from the steering wheel. *i. e.*, toward the bow of the ship. If the pointer $n$ should happen to be directed toward the steering wheel, *i. e.*, toward the stern of the ship, then the apparatus must be turned 180° so that the pointer $h^1$ comes to the rear. The plates $e$ and $f$ must, moreover, be exchanged one for the other so that the inscriptions retain their original position relative to the ship. The pointers $g^1$ and $h^1$ will again be deflected to the same side as the pointer $n$.

If the pointer $n$, whether it be directed forward or backward, should be deflected to "larboard" when the steering wheel is turned to "starboard," *i. e.*, according to German rules, then the screw-bolt $k^2$ is detached from the arm of the lever $k$ which carries the fork $k^3$, and the pointer $h$ is, after the whole apparatus has been turned 180°, connected to the free arm of said lever. The plates $e$ and $f$ are also, if it should be required, exchanged one for the other. In this case the two pointers $g^1$ and $h^1$ will be deflected in the desired, opposite direction to the pointer $n$.

In Fig. 3, a somewhat modified construction of the signaling device is shown in a vertical section. In this construction the movement of the pointer $h^1$ is transmitted to the pointer $g^1$ by means of a reversing epicyclic gearing $r$, $s$, $t$, $u$. The operation of this arrangement is evident from Fig. 3 without further explanation.

A further modification of the signaling device is illustrated in Figs. 5 to 8. The transparent plates $e$ and $f$ are here sector-shaped, and the pointers $g^1$ $h^1$ are rigidly interconnected by means of a shaft $v$ about which they turn. A toothed bevel wheel $w$ is mounted on said shaft so as to mesh with a wheel $x$ connected to the lever arm $k^4$, the latter being coupled by means of the fork $k^3$ and the plate $m$ to the pointer $n$. If the pointers $g^1$ and $h^1$ are to be deflected in the same direction as the pointer $n$ the wheel $w$ must be arranged on the shaft in the position shown in Fig. 6. If the pointers are to be deflected in the opposite direction to the pointer $n$, the wheel $w$ must be transferred to the opposite side of the pivot $c$. This position of the wheel $w$ is indicated by dotted lines in Fig. 6.

We claim:—

1. A helm signal comprising a conical casing adapted to be mounted on the helm stanchion, two transparent plates fitted in diametrically opposed positions on said casing so as to allow of being exchanged and provided with graduated scales and inscriptions being at each side of a plane intersecting the center of the casing longitudinally of the ship, a lantern supported in said casing and adapted to illuminate said plates, upright pointers arranged so as to move along the scales of said plates and coupled so as to be deflected to the same side of the ship, and means for coupling said pointers to the existing helm pointer so as to cause the former to move with the steering gear and indicate the position of the rudder, substantially as set forth.

2. In a helm signal the combination a conical casing adapted to be mounted on the helm stanchion of two transparent plates exchangeably fitted in diametrically opposed positions on said casing and provided with graduated scales and suitable inscriptions being at each side of a plane intersecting the center of the casing longitudinally of the ship, of means arranged in said casing and adapted to illuminate said plates, of upright pointers rotatably mounted on a central pivot of said casing and adapted to move along the scales of said casing, and of means for exchangeably coupling said pointers to the helm pointer so as to indicate identically the position of the rudder. substantially as set forth.

In testimony whereof, we affix our signatures in the presence of two witnesses.

PAUL PETERS.
JAKOB HINRICH PETERS.
PETER ALBERT BEY.

Witnesses:
ERNEST H. L. MUMMENHOFF,
FRANCIS R. STEWART.

Copies of this patent may be obtained for five cents each, by addressing the "Commissioner of Patents, Washington, D. C."